US012770913B2

(12) United States Patent
Amachraa et al.

(10) Patent No.: US 12,770,913 B2
(45) Date of Patent: Oct. 20, 2026

(54) LOW-COST MULTI-CATIONIC LI-GARNET AS A SOLID-STATE IONIC CONDUCTOR FOR LITHIUM BATTERIES

(71) Applicant: SAMSUNG ELECTRONICS CO., LTD., Suwon-si (KR)

(72) Inventors: Mahdi Amachraa, Cambridge, MA (US); Samuel Cross, Cambridge, MA (US); Yan Wang, Brookline, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 782 days.

(21) Appl. No.: 18/113,431

(22) Filed: Feb. 23, 2023

(65) Prior Publication Data

US 2024/0145766 A1 May 2, 2024

Related U.S. Application Data

(60) Provisional application No. 63/421,371, filed on Nov. 1, 2022.

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/0071* (2013.01)

(58) Field of Classification Search
CPC ........... H01M 10/052; H01M 10/0525; H01M 10/0562
See application file for complete search history.

(56) References Cited

U.S. PATENT DOCUMENTS

| | | | |
|---|---|---|---|
| 9,537,175 | B2 | 1/2017 | Kintaka |
| 2021/0043966 | A1 | 2/2021 | Gwon et al. |

(Continued)

FOREIGN PATENT DOCUMENTS

| | | | |
|---|---|---|---|
| CN | 108155413 | A | 6/2018 |
| CN | 107768715 | B | 8/2019 |

(Continued)

OTHER PUBLICATIONS

Ning et al., "The effect of a Ta, Sr co-doping strategy on physical and electrochemical properties of Li7La3Zr2O12 electrolytes", Solid State Ionics, Apr. 5, 2022, 13 total pages, vol. 379, doi:10.1016/J.SSI.2022.115917, XP087021068.

(Continued)

*Primary Examiner* — Kevin E Yoon
(74) *Attorney, Agent, or Firm* — CANTOR COLBURN LLP

(57) ABSTRACT

A lithium garnet material has the formula $Li_{7-w}La_{3-x}(A_{x1}B_{x2}C_{x3})Zr_{2-y}(C_{y1}D_{y2}E_{y3})O_{12}$, where $-0.2 \leq w \leq 0.2$, A is one or a combination of $Na^+$ and $K^+$, B is one or a combination of two or more of $Mg^{2+}$, $Ca^{2+}$, $Sr^{2+}$, and $Ba^{2+}$, and C is one or a combination of two or more of $Y^{3+}$, $Sc^{3+}$, and $Ce^{3+}$ on the $La^{3+}$ site, and D is one or a combination of two or more of $Si^{4+}$, $Sn^{4+}$, $Ti^{4+}$, and $Ce^{4+}$ and E is one or a combination of two or more of $Sb^{5+}$, $Bi^{5+}$, $Ta^{5+}$, and $Nb^{5+}$ on the $Zr^{4+}$ site, $0<x<2$, $0<y<2$, and $x1+x2+x3=x$ and $y1+y2+y3=y$ either satisfy a charge balance mechanism with their respective doping site or satisfy any combination that maintains the charge neutrality of the material.

19 Claims, 9 Drawing Sheets
(9 of 9 Drawing Sheet(s) Filed in Color)

(56) References Cited

U.S. PATENT DOCUMENTS

| | | | |
|---|---|---|---|
| 2021/0344039 | A1 | 11/2021 | Leukel et al. |
| 2022/0044837 | A1 | 2/2022 | Gwon et al. |

FOREIGN PATENT DOCUMENTS

| | | | | | |
|---|---|---|---|---|---|
| CN | 111934002 | A | | 11/2020 | |
| CN | 112573574 | A | | 3/2021 | |
| JP | 2013-149493 | A | | 8/2013 | |
| JP | 2018-195483 | A | | 12/2018 | |
| JP | 2022115833 | A | | 8/2022 | |
| KR | 1020220120979 | A | * | 8/2022 | ............. C04B 35/64 |
| WO | 2022/039953 | A1 | | 2/2022 | |
| WO | 2022/195277 | A1 | | 9/2022 | |

OTHER PUBLICATIONS

Stockham et al., “Assessing the Importance of Cation Size in the Tetragonal-Cubic Phase Transition in Lithium-Garnet Electrolytes”, Chemistry, Jan. 27, 2022, 9 total pages, vol. 28, doi:10.1002/chem.202103442, XP093135789.

Abrha et al., “Dual-Doped Cubic Garnet Solid Electrolytes with Superior Air Stability”, ACS Appl Mater Interfaces, May 14, 2020, pp. 25709-25717, vol. 12, doi:10.1021/acsami.0c01289, XP093135803.

Communication dated Mar. 11, 2024, issued by European Patent Office in European Patent Application No. 23206092.1.

* cited by examiner

LOW-COST MULTI-CATIONIC LI-GARNET AS A SOLID-STATE IONIC CONDUCTOR FOR LITHIUM BATTERIES

CROSS-REFERENCE TO RELATED APPLICATION

This application is based on and claims priority from U.S. Provisional Application No. 63/421,371 filed on Nov. 1, 2022 in the U.S. Patent and Trademark Office, the disclosure of which is incorporated herein by reference in its entirety.

BACKGROUND

1. Field

Materials according to embodiments relate to solid electrolyte materials for Li solid-state batteries.

2. Description of the Related Art

The fast development of portal electronics and electric vehicles has increased the demand for electrochemical energy storage systems. In the meantime, the related safety issues are gathering more attention.

Due to their flammability and possible leakage, organic liquid electrolytes pose a safety risk in conventional Li-ion batteries. In this context, solid-state batteries (SSBs) are considered to be the next-generation batteries with improved safety and energy density.

Solid-state lithium-ion conductors (SSLICs) with high ionic conductivities play an important role in SSBs. During the past two decades, there has been an increasing amount of discoveries on new SSLICs. Most of them are focused on sulfide SSLICs with high ionic conductivities. However, a very limited number of oxide materials were developed for SSBs, and so far, only lithium garnet is considered to be the oxide-type electrolyte for lithium SSBs.

For solid-state electrolytes in SSBs, sulfide-based materials have high ionic conductivities (>10 mS/cm), but are not really safe ($H_2S$ in air condition) and have limited electrochemical stability (for example, unstable against Li metal).

Oxide SSLICs, which have better electrochemical and chemical stability than sulfide SSLICs, have been largely limited in garnet-type materials. The ionic conductivities of reported oxide SSLICs are generally lower than those of sulfide SSLICs.

La in garnet material ($Li_7La_3Zr_2O_{12}$) is also rare in earth, heavy and expensive, compared to other elements (such as Sr, Strontium). In particular, La (lanthanum), which has a density of 6.145 kg/L, has an abundance in Earth's crust of 39 mg/kg ($1.08\times10^{18}$ kg), while Sr (strontium), which has a density of 2.64 kg/L, has an abundance in Earth's crust of 370 mg/kg ($1.025\times10^{19}$ kg).

Solid electrolyte materials with superionic conductivity and interfacial stability are desirable materials to form all-solid-state Li-metal batteries. A garnet-type lithium conductor is a promising solid electrolyte for the development of all-solid-state lithium ion batteries. For use as Li-ion conductors, the cubic Li-garnet $Li_7La_3Zr_2O_{12}$ is a desirable composition as its Li-ion conductivity is 2 orders of magnitude higher than its tetragonal counterpart phase. The cubic modification of the pure LLZO is known to not be stable at room temperature, and several doping strategies have previously been proposed to stabilize at room temperature. For example, the introduction of supervalant cations which cause the reduction of the Li+ content (Li+ vacancies) was initially proposed as a mechanism to form the cubic LLZO phase.

In particular, some approaches include the following: (1) Ta-LLZO/Nb-LLZO: Li-garnet with cubic phase stabilized through substitution of Zr for Ta or Nb, inducing Li vacancies. Compositions include $Li_{7-x}La_3Ta_xZr_{2x}O_{12}$ and $Li_{7-x}La_3Nb_xZr_{2x}O_{12}$ with x~0.4. (2) Al-LLZO/Ga-LLZO: Li-garnet with cubic phase stabilized through substitution of Li for Al or Ga. Compositions include $Li_{7-3x}Al_xLa_3Zr_2O_{12}$ and $Li_{7-3x}Ga_xLa_3Zr_2O_{12}$ with x~0.2. (3) $Li_{7-3x}M1_xM2_yM3_{2-y}M4O_{12}$, M1: Al, M2: Nb, Ta, Sb, Bi, M3: Zr, M4:$La_7$.

However, drawbacks of doping methods which induce Li vacancies include: decrease of attainable conductivity due to decreased Li content; Li-site dopants (e.g., $Al^{3+}$, $Fe^{3+}$, $Ga^{3+}$) can decrease Li-ion conductivity by occupying sites used for Li-ion hopping; and higher cost of many elements used for substitutional doping.

Thus, there is a need for improvement in the materials used as solid electrolytes for Li solid-state batteries.

Information disclosed in this Background section has already been known to or derived by the inventors before or during the process of achieving the embodiments of the present application, or is technical information acquired in the process of achieving the embodiments. Therefore, it may contain information that does not form the prior art that is already known to the public.

SUMMARY

The disclosure provides materials used as solid electrolytes for Li solid-state batteries, according to embodiments.

According to an embodiment, there is an approach which focuses on the development of new lithium garnet compositions where the introduction of multi-dopant species into the $Zr^{4+}$ and $La^{3+}$ sites of the $Li_7La_3Zr_2O_{12}$ (LLZO) material stabilizes derivatives of the cubic LLZO phase while maintaining nominal Li concentrations and lowering the total material cost by replacing $La^{3+}$ and $Zr^{4+}$ with elements of which the combination is less expensive than the parent LLZO composition.

In an embodiment, new lithium garnet compositions with cubic phases are provided by co-doping the LLZO composition with $A^+$ ($Na^+$, $K^+$), $B^{2+}$($Mg^{2+}$, $Ca^{2+}$, $Sr^{2+}$, $Ba^{2+}$), $C^{3+}$($Y^{3+}$, $Sc^{3+}$, $Ce^{3+}$) on the $La^{3+}$ site, and $C^{3+}$($Y^{3+}$, $Sc^{3+}$, $Ce^{3+}$), $D^{4+}$($Ce^{4+}$, $Si^{4+}$, $Sn^{4+}$, $Ti^{4+}$), $E^{5+}$ ($Sb^{5+}$, $Bi^{5+}$, $Ta^{5+}$, $Nb^{5+}$) on the $Zr^{4+}$ site, wherein the strategic combination of one element of more of each oxidation state type strategically leads to a lower cost composition of the cubic LLZO composition, while maintaining the nominal concentration of Li (7 per formula unit). Furthermore, co-doping both $La^{3+}$ and $Zr^{4+}$ sites leads to an increased configurational entropy ($S_{ideal}$) which consequently increases the stability of phases historically known as unstable.

Embodiments demonstrate several approaches to optimize Li-garnet compositions through the co-doping of $La^{3+}$ and $Zr^{4+}$ sites of the LLZO material as to maximize the content of less expensive elements, such as $Si^{4+}$ and $Ca^{2+}$.

Thus, an embodiment includes a lithium garnet material having the following formula:

$$Li_{7-w}La_{3-x}(A_{x1}B_{x2}C^1{}_{x3})Zr_{2-y}(C^2{}_{y1}D_{y2}E_{y3})O_{12}$$

where $-0.2\leq w\leq0.2$, A is one or a combination of ($Na^+$, $K^+$), B is one or a combination of ($Mg^{2+}$, $Ca^{2+}$, $Sr^{2+}$, $Ba^{2+}$), $C^1$ is one or a combination of ($Y^{3+}$, $Sc^{3+}$, $Ce^{3+}$) on the $La^{3+}$ site, and $C^2$ is one or a combination of ($Y^{3+}$, $Sc^{3+}$, $Ce^{3+}$), D is one or a combination of ($Si^{4+}$, $Sn^{4+}$, $Ti^{4+}$, $Ce^{4+}$), E is one or a combination of ($Sb^{5+}$, $Bi^{5+}$, $Ta^{5+}$, $Nb^{5+}$) on the $Zr^{4+}$ site, $1 \leq x < 3$, $0 < y \leq 2$, and ($x1+x2+x3=x$) and ($y1+y2+y3=y$) either satisfy a charge balance mechanism with their respective doping site ($La^{3+}$, $Zr^{4+}$, respectively), or satisfy any combination that maintains the charge neutrality of the material.

Another embodiment includes a lithium garnet material having the following formula:

$$Li_{7-w}La_{3-x}(A_{x1}B_{x2}C^1_{x3})Zr_{2-y}(C^2_{y1}D_{y2}E_{y3})O_{12}$$

where $-0.2 \leq w \leq 0.2$, A is one or a combination of ($Na^+$, $K^+$), B is one or a combination of ($Mg^{2+}$, $Ca^{2+}$, $Sr^{2+}$, $Ba^{2+}$), $C^1$ is one or a combination of ($Y^{3+}$, $Sc^{3+}$, $Ce^{3+}$) on the $La^{3+}$ site, and $C^2$ is one or a combination of ($Y^{3+}$, $Sc^{3+}$, $Ce^{3+}$), D is one or a combination of ($Si^{4+}$, $Sn^{4+}$, $Ti^{4+}$, $Ce^{4+}$), E is one or a combination of ($Sb^{5+}$, $Bi^{5+}$, $Ta^{5+}$, $Nb^{5+}$) on the $Zr^{4+}$ site, $0.2 < x < 3$, $0 < y \leq 2$, and ($x1+x2+x3=x$) and ($y1+y2+y3=y$) either satisfy a charge balance mechanism with their respective doping site ($La^{3+}$, $Zr^{4+}$, respectively), or satisfy any combination that maintains the charge neutrality of the material.

Another embodiment includes the aforementioned lithium garnet material, wherein $0.2 < x \leq 2$ and $0 < y \leq 2$.

Another embodiment includes the aforementioned lithium garnet material, wherein $y2 > 0$.

Another embodiment includes the aforementioned lithium garnet material, wherein the material comprises $Si^{4+}$ and at least one of $Ca^{2+}$, $Sr^{2+}$, and $Bi^{5+}$.

Another embodiment includes the aforementioned lithium garnet material, wherein the material comprises $Si^{4+}$ and $Ca^{2+}$.

Another embodiment includes the aforementioned lithium garnet material, wherein the material comprises $Si^{4+}$ and $Sr^{2+}$.

Another embodiment includes the aforementioned lithium garnet material, wherein the material comprises $Si^{4+}$ and $Bi^{5+}$.

Another embodiment includes the aforementioned lithium garnet material, wherein the material comprises $Si^{4+}$, $Bi^{5+}$, and at least one of $Ca^{2+}$ and $Sr^{2+}$.

Another embodiment is a solid state lithium battery comprising a cathode active material layer, an anode active material layer, and a solid electrolyte layer formed between the cathode active material layer and the anode active material layer, wherein the solid electrolyte layer comprises any of the aforementioned materials.

BRIEF DESCRIPTION OF DRAWINGS

The patent or application file contains at least one drawing executed in color. Copies of this patent or patent application publication with color drawing(s) will be provided by the Office upon request and payment of the necessary fee.

Example embodiments of the inventive concept will be more clearly understood from the following detailed description taken in conjunction with the accompanying drawings in which.

DETAILED DESCRIPTION OF EXAMPLE EMBODIMENTS

Figure 1:
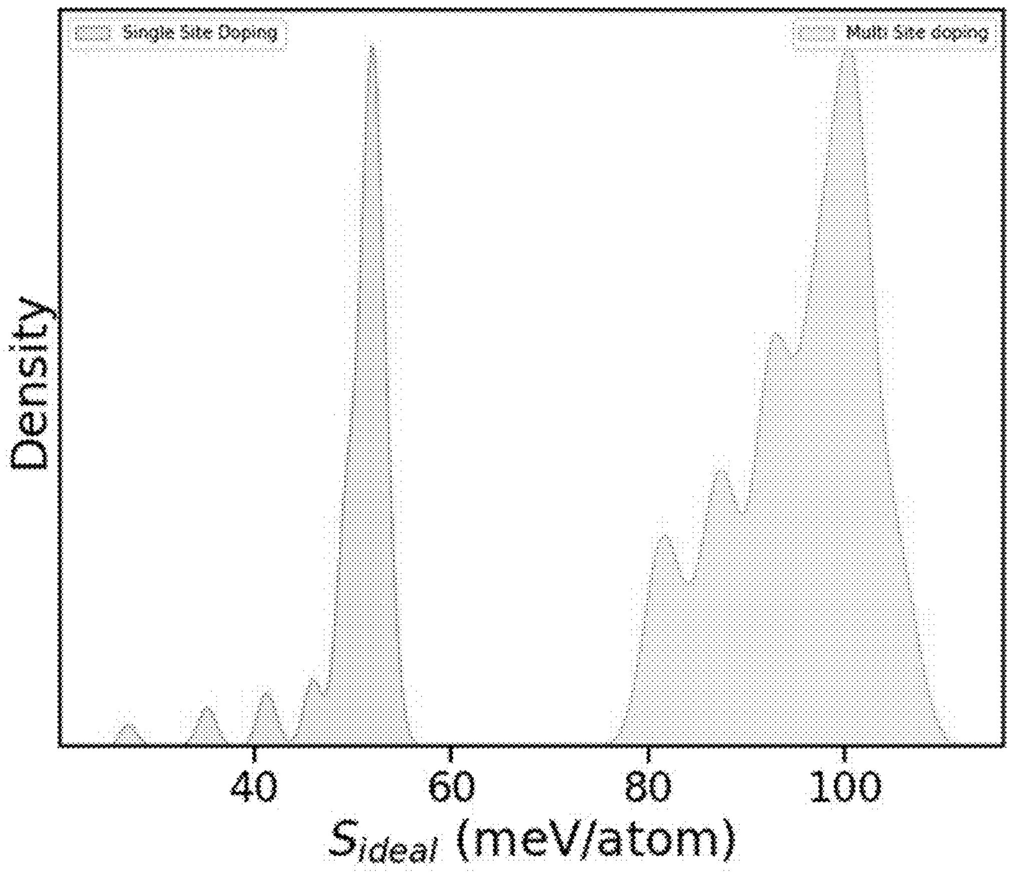
FIG. 1 shows the distribution of $S_{ideal}$ (meV/atom) in compounds where only $Zr^{4+}$ is doped with at most 4 species (labeled as single site doping) and the distribution of $S_{ideal}$ (meV/atom) where $La^{3+}$ and $Zr^{4+}$ are co-doped (labeled as multi-site doping) with at least 2 species on each site $Li_{7-w}La_{3-x}(A_{x1}B_{x2}C^1_{x3})Zr_{2-y}(C^2_{y1}D_{y2}E_{y3})O_{12}$.
Figure 2A:
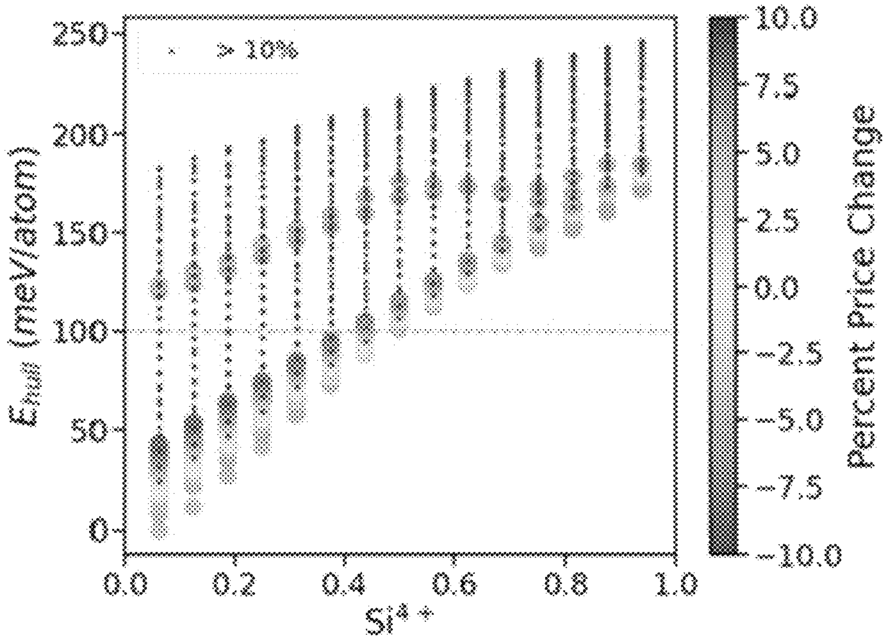
FIG. 2A shows the optimization of low-cost $Li_{7-w}La_{3-x}(A_{x1}B_{x2}C^1_{x3})Zr_{2-y}(C^2_{y1}D_{y2}E_{y3})O_{12}$ where the composition's content is tailored as to introduce the lower cost element $Si^{4+}$.
Figure 2B:
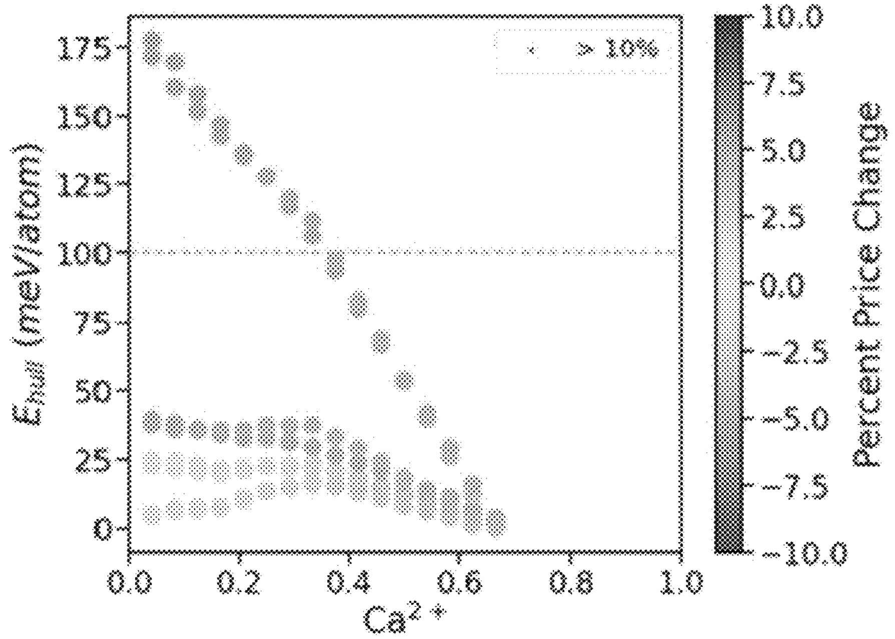
FIG. 2B shows the optimization of low-cost $Li_{7-w}La_{3-x}(A_{x1}B_{x2}C^1_{x3})Zr_{2-y}(C^2_{y1}D_{y2}E_{y3})O_{12}$ where the composition's content is tailored as to introduce the lower cost element $Ca^{2+}$.
Figure 2C:
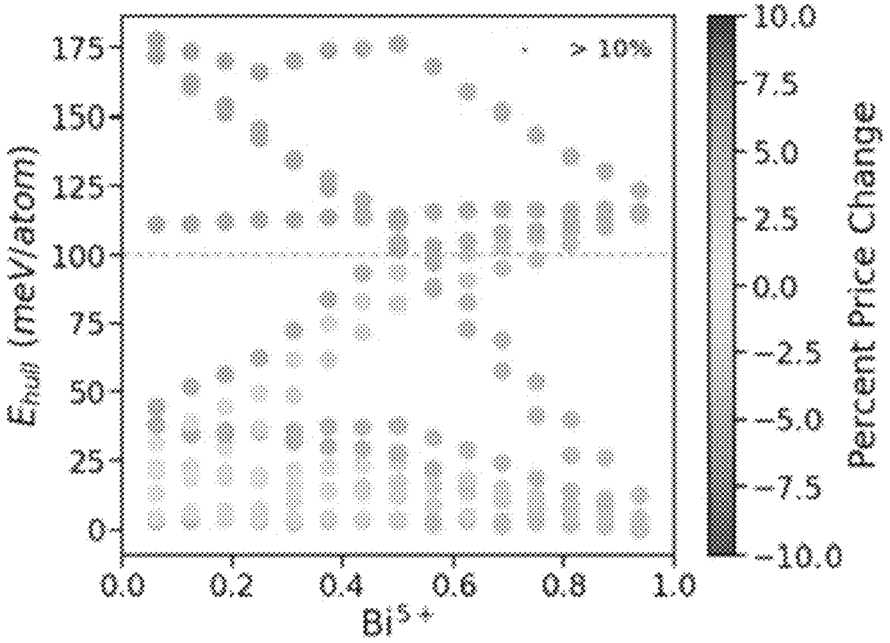
FIG. 2C shows the optimization of low-cost $Li_{7-w}La_{3-x}(A_{x1}B_{x2}C^1_{x3})Zr_{2-y}(C^2_{y1}D_{y2}E_{y3})O_{12}$ where the composition's content is tailored as to introduce the lower cost element $Bi^{5+}$.
Figure 2D:
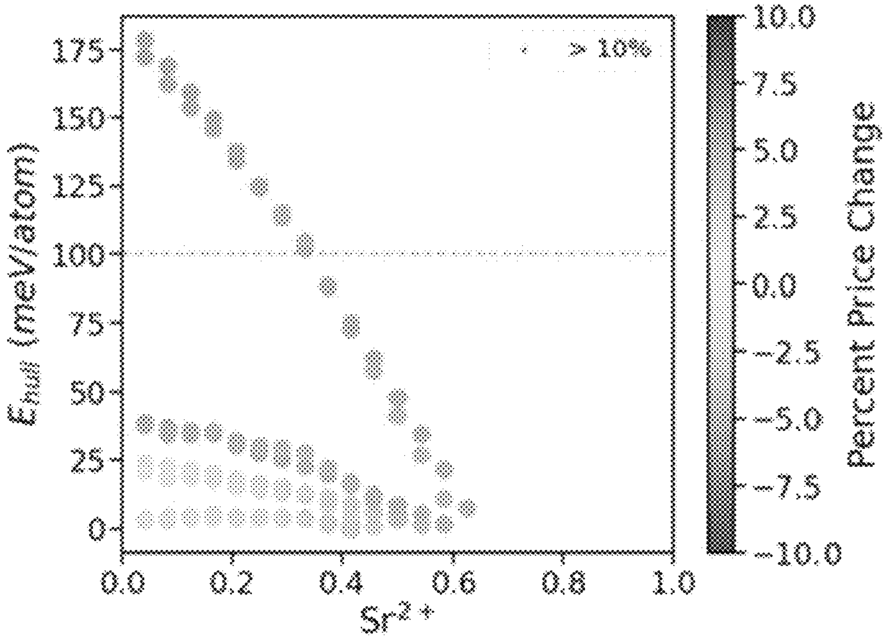
FIG. 2D shows the optimization of low-cost $Li_{7-w}La_{3-x}(A_{x1}B_{x2}C^1_{x3})Zr_{2-y}(C^2_{y1}D_{y2}E_{y3})O_{12}$ where the composition's content is tailored as to introduce the lower cost element $Sr^{2+}$.

The embodiments of the disclosure described herein are example embodiments, and thus, the disclosure is not limited thereto, and may be realized in various other forms. Each of the embodiments provided in the following description is not excluded from being associated with one or more features of another example or another embodiment also provided herein or not provided herein but consistent with the disclosure. For example, even if matters described in a specific example or embodiment are not described in a different example or embodiment thereto, the matters may be understood as being related to or combined with the different example or embodiment, unless otherwise mentioned in descriptions thereof. In addition, it should be understood that all descriptions of principles, aspects, examples, and embodiments of the disclosure are intended to encompass structural and functional equivalents thereof. In addition, these equivalents should be understood as including not only currently well-known equivalents but also equivalents to be developed in the future.

As used herein, expressions such as "at least one of," when preceding a list of elements, modify the entire list of elements and do not modify the individual elements of the list. For example, the expression, "at least one of a, b and c," should be understood as including only a, only b, only c, both a and b, both a and c, both b and c, or all of a, b and c.

Embodiments include novel doping strategies of the parent structure LLZO of the form $Li_{7-w}La_{3-x}(A_{x1}B_{x2}C^1_{x3})Zr_{2-y}(C^2_{y1}D_{y2}E_{y3})O_{12}$, where $-0.2 \leq w \leq 0.2$, A can be one or a combination of ($Na^+$, $K^+$), B can be one or a combination of ($Mg^{2+}$, $Ca^{2+}$, $Sr^{2+}$, $Ba^{2+}$), $C^1$ can be one or a combination of ($Y^{3+}$, $Sc^{3+}$, $Ce^{3+}$) on the $La^{3+}$ site, and $C^2$ can be one or a combination of ($Y^{3+}$, $Sc^{3+}$, $Ce^{3+}$), D can be one or a combination of ($Si^{4+}$, $Sn^{4+}$, $Ti^{4+}$, $Ce^{4+}$), E can be one or a combination of ($Sb^{5+}$, $Bi^{5+}$, $Ta^{5+}$, $Nb^{5+}$) on the $Zr^{4+}$ site. The multi-cation co-doping of both $La^{3+}$ and $Zr^{4+}$ increases the configurational entropy (i.e., ~100 meV/atom when, e.g., $1 \leq x1+x2+x3=x<3$; $0<y1+y2+y3=y \leq 2$) and therefore aids the stabilization of phases with higher concentrations of $Si^{4+}$, hence lowering the total cost of the Li garnet compositions.

Benefits of the multi-cation co-doping substitutions of $La^{3+}$ and $Zr^{4+}$ include: increasing the total configurational entropy of the phases and hence stabilizing higher concentrations of elements previously deemed as unstable; providing multiple design strategies to minimize the total cost of cubic Li garnet derivatives LLZO phases; maximizing the resistance to electrochemical decomposition through the insertion of a diverse set of species of different oxidation states and sizes which lead to a substantial increase of configurational entropy; and reducing the reduction potential against Li metal, therefore increasing Li stability in solid-state batteries.

The materials in embodiments include those which maximize the total configurational entropy, minimize the total cost of the material, and maintain a cubic phase LLZO phase:

$$Li_{7-w}La_{3-x}(A_{x1}B_{x2}C^1_{x3})Zr_{2-y}(C^2_{y1}D_{y2}E_{y3})O_{12}$$

where $-0.2 \leq w \leq 0.2$, A can be one or a combination of ($Na^+$, $K^+$), B can be one or a combination of ($Mg^{2+}$, $Ca^{2+}$, $Sr^{2+}$, $Ba^{2+}$), $C^1$ can be one or a combination of ($Y^{3+}$, $Sc^{3+}$, $Ce^{3+}$) on the $La^{3+}$ site, and $C^{2+}$ can be one or a combination of ($Y^{3+}$, $Sc^{3+}$, $Ce^{3+}$), D can be one or a combination of ($Si^{4+}$, $Sn^{4+}$, $Ti^{4+}$, $Ce^{4+}$), E can be one or a combination of ($Sb^{5+}$, $Bi^{5+}$, $Ta^{5+}$, $Nb^{5+}$) on the $Zr^{4+}$ site, $1 \leq x < 3$, $0 < y \leq 2$, and ($x1+x2+x3=x$) and ($y1+y2+y3=y$) can either satisfy a charge balance mechanism with their respective doping site ($La^{3+}$, $Zr^{4+}$, respectively), or satisfy any combination that maintains the charge neutrality of the overall composition.

The materials in embodiments adopt the cubic LLZO phase, and enable specific chemical, structural, and stoichiometric requirements to achieve low-cost multi-cationic Li-garnet as a solid-state ionic conductor for lithium batteries.

Also, the materials in embodiments include novel doping strategies of the parent structure LLZO of the form:

$$Li_{7-w}La_{3-x}(A_{x1}B_{x2}C^1_{x3})Zr_{2-y}(C^2_{y1}D_{y2}E_{y3})O_{12}$$

where $-0.2 \leq w \leq 0.2$, A can be one or a combination of ($Na^+$, $K^+$), B can be one or a combination of ($Mg^{2+}$, $Ca^{2+}$, $Sr^{2+}$, $Ba^{2+}$), $C^1$ can be one or a combination of ($Y^{3+}$, $Sc^{3+}$, $Ce^{3+}$) on the $La^{3+}$ site, and $C^2$ can be one or a combination of ($Y^{3+}$, $Sc^{3+}$, $Ce^{3+}$), D can be one or a combination of ($Si^{4+}$, $Sn^{4+}$, $Ti^{4+}$, $Ce^{4+}$), E can be one or a combination of ($Sb^{5+}$, $Bi^{5+}$, $Ta^{5+}$, $Nb^{5+}$) on the $Zr^{4+}$ site, $0.2 < x < 3$, $0 < y \leq 2$, and ($x1+x2+x3=x$) and ($y1+y2+y3=y$) can either satisfy a charge balance mechanism with their respective doping site ($La^{3+}$, $Zr^{4+}$, respectively), or satisfy any combination that maintains the charge neutrality of the overall composition.

In this regard, the multi-cation co-doping of both $La^{3+}$ and $Zr^{4+}$ increases the configurational entropy (e.g., ~100 meV/atom when $0.2 < x1+x2+x3=x < 3$, $0 < y1+y2+y3=y \leq 2$), which maximizes the stabilization of previously known unstable cations at unprecedented concentrations.

Another embodiment includes values for x and y where $0.2 < x \leq 2$ and $0 < y \leq 2$, and yet another embodiment includes $y2 > 0$.

Another embodiment includes a material which comprises $Si^{4+}$ and at least one of $Ca^{2+}$, $Sr^{2+}$, and $Bi^{5+}$. For example, an embodiment includes a material which comprises $Si^{4+}$ and $Ca^{2+}$. As another example, an embodiment includes a material which comprises $Si^{4+}$ and $Sr^{2+}$. As another example, an embodiment includes a material which comprises $Si^{4+}$ and $Bi^{5+}$. As another example, an embodiment includes a material which comprises $Si^{4+}$, $Bi^{5+}$, and at least one of $Ca^{2+}$ and $Sr^{2+}$.

A preferred embodiment includes a material in which B comprises $Ca^{2+}$. Another preferred another embodiment includes a material in which E comprises $Ta^{5+}$. A more preferred embodiment includes a material in which D comprises $Si^{4+}$, wherein the material further comprises at least one co-dopant. For example, a more preferred embodiment includes a material in which B comprises $Ca^{2+}$ and D comprises $Si^{4+}$. Another more preferred embodiment includes a material in which B comprises $Ca^{2+}$ and E comprises $Ta^{5+}$. A particularly preferred embodiment includes a material in which B comprises $Ca^{2+}$, D comprises $Si^{4+}$, and E comprises $Ta^{5+}$.

Also, an embodiment includes $0 \leq x1 < 3$, $0 \leq x2 < 3$, $0 \leq x3 < 3$, $0 \leq y1 \leq 2$, $0 \leq y2 \leq 2$, and $0 \leq y3 \leq 2$, as long as $0.2 < x1+x2+x3 < 3$ and $0 < y1+y2+y3 \leq 2$. In addition, an embodiment includes $0 \leq x1 < 3$, $0 \leq x2 < 3$, $0 \leq x3 < 3$, $0 \leq y1 \leq 2$, $0 \leq y2 \leq 2$, and $0 \leq y3 \leq 2$, as long as $1 \leq x1+x2+x3 < 3$ and $0 < y1+y2+y3 \leq 2$. A preferred embodiment includes $0 < x2 \leq 0.75$, $0 < y2 \leq 0.5$, and $0 < y3 \leq 0.75$. Another preferred embodiment includes $0 < x2 \leq 0.5$, $0 < y2 \leq 0.625$, and $0 < y3 \leq 0.5$.

Embodiments of the lithium garnet material can be made using a standard solid-state method. In this method, precursor powders are combined in a certain ratio depending on the composition of the target material. In a typical preparation, precursors may consist of lithium carbonate, lanthanum hydroxide, zirconium oxide, and at least one precursor containing each of the included metals from A, B, $C^1$, $C^2$, D, and E. Examples of metal precursors include metal oxides, hydroxides, carbonates, and nitrates.

The precursor mixture may be mixed by a method such as ball milling or planetary milling to produce a homogeneous mixture. Mixing may be done with a suitable solvent such as ethanol, isopropanol, ethylene glycol, or acetone to assist with the uniform dispersion of the precursors.

The precursor mixture may then be heat treated to a temperature of 600 C-1100 C, for a period of 1 hour to 48 hours to produce an oxide powder with the desired composition and crystal structure.

Subsequently the oxide powder may be compressed using a hydraulic uniaxial press to form a densely packed pellet. Heat treatment may then be applied at a temperature of about 900 C-1500 C for 1 hour to 48 hours to produce a dense pellet which may be used as a solid electrolyte separator in a solid state lithium battery cell.

For instance, the calcined powder may be formed into a pellet through application of uniaxial pressure of 100-500 MPa. The pellet may then be heat treated at 1200 C for 2 hours to form a dense sintered solid electrolyte separator suitable for use in a lithium battery cell.

As an example of making a battery full cell using a garnet solid electrolyte and a Li-metal anode, an ionic liquid electrolyte can be used as the cathode electrolyte (catholyte) and a garnet oxide electrolyte can be used as the Li-metal anode electrolyte, (anolyte). First, 20-μm-thick Li metal on 10-μm-thick Cu foil (Honjo Metal Co., Ltd.) can be attached to the protonated surface of the LLZO pellet by cold-isostatic pressing at 250 MPa. A commercially available NCM111 electrode (loading capacity: 3.2 g $cm^{-3}$, active material: 93 wt %; Samsung SDI) can be coated onto Al foil as the cathode. The ionic liquid Pyr13FSI (Kanto Chemical Co. Inc.) can be mixed with LiFSI salt (2M) to prepare the catholyte. The mixed solution can be dropped onto the cathode and then infiltrated into the cathode under a vacuum for 2 h. The infiltrated amount of ionic liquid can be 20 wt % relative to the cathode weight. The infiltrated cathode can be placed on the other side of the LLZO pellet in a 2032-coin cell. To eliminate the possibility of direct contact between the ionic liquid and Li-metal, a relatively small cathode (0.4 cm in diameter) can be used for the hybrid electrolyte cell. Finally, the cell can be sealed under a vacuum using a pouch cell.

A 110 micrometer pellet of LLZO (garnet) can be used. An even thinner pellet can desirably be made by a method like tape casting, down to 20 micrometer. The garnet electrolyte can have a thickness in the range of 20-150 micrometers. Another thickness range for the garnet electrolyte is 20-110 micrometers.

An embodiment of the aforementioned materials can be assembled together with a cathode active material layer and an anode active material layer to be used in an embodiment which is a solid state lithium battery comprising a cathode active material layer, an anode active material layer, and a solid electrolyte layer formed between the cathode active material layer and the anode active material layer, wherein the solid electrolyte layer comprises any of the aforementioned materials.

EXAMPLES

Embodiments will now be illustrated by way of the following examples, which do not limit the embodiments in any way.

Using high-throughput density functional theory (DFT) calculations, a large amount of chemical strategies covering all relevant $Li_{7-w}La_{3-x}(A_{x1}B_{x2}C^1{}_{x3})Zr_{2-y}(C^2{}_{y1}D_{y2}E_{y3})O_{12}$ compositions was investigated. The phase stability of predicted materials was estimated by calculating the energy above the linear combination of stable phases in the first principle phase diagram, also known as the energy above hull ($E_{hull}$). For phase diagram construction, the energies of all compounds other than those of direct interest in this work were obtained from the Materials Project using the Materials Project Application Programming Interface (API). To assert a threshold value beyond which predicted materials in $Li_{7-w}La_{3-x}(A_{x1}B_{x2}C^1{}_{x3})Zr_{2-y}(C^2{}_{y1}D_{y2}E_{y3})O_{12}$ are deemed unstable, the ideal configurational entropy ($S_{ideal}=-K_b\Sigma_i p_i \ln p_i$) is computed, where $K_b$ is the Boltzmann constant, $p_i$ is the probability of each state (occupied or unoccupied) and the sum is over all states for each site. FIG. 1 shows the distribution of $S_{ideal}$ in $Li_{7-w}La_{3-x}(A_{x1}B_{x2}C^1{}_{x3})Zr_{2-y}(C^2{}_{y1}D_{y2}E_{y3})O$ where it is observed that the distribution is mainly centered around roughly 100 meV/atom. In comparison, the distribution of $S_{ideal}$ in compositions where only the $Zr^{4+}$ site is doped with at most 4 species is observed to be centered around 50 meV/atom. This supports a key contention that co-doping both $Zr^{4+}$ and $La^{3+}$ leads to an increased configurational entropy and hence facilitates the synthesis of phases with elements previously deemed as unstable. That is, an increased configurational entropy leads to stabilization of higher $E_{hull}$ phases.

FIGS. 2A-2D shows cases where the content of less expensive elements such as $Si^{4+}$ and $Ca^{2+}$ were optimized as to lower the total cost of $Li_7La_{3-x}(A_{x1}B_{x2}C^1{}_{x3})_xZr_{2-y}(C^2{}_{y1}D_{y2}E_{y3})O_{12}$ compared to the parent LLZO composition. It is observed that $Si^{4+}$ concentrations can reach an unprecedented concentration level up to ~0.5 while maintaining two keys properties: the cubic LLZO phase, and lowering the total cost compared to the LLZO parent structure.

Table 1 below shows examples of some $Si^{4+}$ optimized compositions according to the embodiment.

TABLE 1

Examples of $Si^{4+}$ optimized compositions

| Chemical System | Chemical Formula | Lattice[a b c](Å) | Volume (Å) | Density (g/cc) | $E_{hull}$ (meV/atom) | $Si^{4+}$ concentration | % price change |
|---|---|---|---|---|---|---|---|
| Bi—La—Li—O—Si—Sr | Sr15Li56La9Si(Bi5O32)3 | [13.41 13.43 12.79] | 2302.01 | 5.52 | 0.0 | 0.06 | −3.35 |
| La—Li—O—Si—Sn—Y | Li56LaY23Si(Sn5O32)3 | [12.8 12.8 12.32] | 2018.42 | 4.87 | 42.71 | 0.06 | 8.13 |
| La—Li—O—Si—Sn—Y | Li56La2Y22Si(Sn5O32)3 | [12.82 12.82 12.32] | 2024.38 | 4.89 | 41.53 | 0.06 | 7.74 |
| La—Li—O—Si—Sn—Y | Li56La3Y21Si(Sn5O32)3 | [12.83 12.83 12.34] | 2031.92 | 4.92 | 40.11 | 0.06 | 7.34 |
| La—Li—O—Si—Sn—Y | Li56La4Y20Si(Sn5O32)3 | [12.85 12.85 12.35] | 2039.48 | 4.94 | 38.56 | 0.06 | 6.95 |
| La—Li—O—Si—Sn—Y | Li56La5Y19Si(Sn5O32)3 | [12.87 12.87 12.36] | 2047.39 | 4.96 | 37.5 | 0.06 | 6.55 |
| La—Li—O—Si—Sn—Y | Li56La7Y17Si(Sn5O32)3 | [12.9 12.9 12.39] | 2061.82 | 5.01 | 34.26 | 0.06 | 5.76 |
| La—Li—O—Si—Sn—Y | Li56La8Y16Si(Sn5O32)3 | [12.92 12.92 12.39] | 2068.32 | 5.03 | 33.0 | 0.06 | 5.36 |
| La—Li—O—Si—Sn—Y | Li56La9Y15Si(Sn5O32)3 | [12.94 12.93 12.41] | 2077.19 | 5.05 | 32.42 | 0.06 | 4.97 |
| La—Li—O—Si—Sn—Y | Li56La10Y14Si(Sn5O32)3 | [12.96 12.94 12.43] | 2084.55 | 5.07 | 31.02 | 0.06 | 4.57 |
| La—Li—O—Si—Sn—Y | Li56La11Y13Si(Sn5O32)3 | [13. 12.95 12.43] | 2092.45 | 5.09 | 30.65 | 0.06 | 4.18 |
| La—Li—O—Si—Sn—Y | Li56La12Y12Si(Sn5O32)3 | [13. 12.97 12.44] | 2098.81 | 5.12 | 29.8 | 0.06 | 3.78 |
| La—Li—O—Si—Sn—Y | Li56La13Y11Si(Sn5O32)3 | [13.03 12.98 12.46] | 2107.2 | 5.14 | 28.69 | 0.06 | 3.39 |
| La—Li—O—Si—Sn—Y | Li56La14Y10Si(Sn5O32)3 | [13.04 13.01 12.47] | 2115.6 | 5.15 | 27.75 | 0.06 | 2.99 |
| La—Li—O—Si—Sn—Y | Li56La15Y9Si(Sn5O32)3 | [13.05 13.04 12.48] | 2123.19 | 5.18 | 27.1 | 0.06 | 2.59 |
| La—Li—O—Si—Sn—Y | Li56La6Y18Si(Sn5O32)3 | [12.89 12.89 12.37] | 2054.43 | 4.98 | 35.92 | 0.06 | 6.15 |
| Bi—Ca—La—Li—O—Si | Li56Ca15La9Si(Bi5O32)3 | [13.19 13.26 12.64] | 2211.36 | 5.21 | 12.23 | 0.06 | −3.24 |
| La—Li—O—Si—Sn—Y | Li56La23YSi(Sn5O32)3 | [13.18 13.17 12.57] | 2182.9 | 5.34 | 17.23 | 0.06 | −0.57 |
| La—Li—O—Sb—Si—Sr | Sr15Li56La9Si(Sb5O32)3 | [13.21 13.25 12.52] | 2191.36 | 4.81 | 7.46 | 0.06 | −4.05 |
| La—Li—O—Si—Sn—Y | Li56La22Y2Si(Sn5O32)3 | [13.18 13.14 12.57] | 2176.38 | 5.32 | 18.69 | 0.06 | −0.17 |
| Ca—La—Li—O—Sb—Si | Li56Ca15La9Si(Sb5O32)3 | [12.99 13.07 12.36] | 2098.44 | 4.46 | 15.93 | 0.06 | −3.94 |
| La—Li—O—Si—Sn—Y | Li56La20Y4Si(Sn5O32)3 | [13.14 13.11 12.54] | 2160.66 | 5.28 | 21.15 | 0.06 | 0.62 |
| La—Li—O—Si—Sn—Y | Li56La19Y5Si(Sn5O32)3 | [13.12 13.11 12.53] | 2153.71 | 5.26 | 22.55 | 0.06 | 1.01 |
| La—Li—O—Si—Sn—Y | Li56La21Y3Si(Sn5O32)3 | [13.17 13.13 12.55] | 2169.33 | 5.29 | 20.31 | 0.06 | 0.22 |
| La—Li—O—Si—Sn—Y | Li56La18Y6Si(Sn5O32)3 | [13.11 13.08 12.51] | 2145.08 | 5.24 | 23.9 | 0.06 | 1.41 |
| La—Li—O—Si—Sn—Y | Li56La17Y7Si(Sn5O32)3 | [13.1 13.06 12.5] | 2138.63 | 5.22 | 25.18 | 0.06 | 1.8 |
| La—Li—O—Si—Sn—Y | Li56La16Y8Si(Sn5O32)3 | [13.07 13.04 12.49] | 2130.19 | 5.2 | 25.79 | 0.06 | 2.2 |
| La—Li—O—Si—Sn—Y | Li56LaY23Si2(Sn7O48)2 | [12.76 12.77 12.29] | 2003.28 | 4.83 | 53.43 | 0.12 | 7.88 |
| La—Li—O—Si—Sn—Y | Li28La3Y9SiSn7O48 | [12.86 12.86 12.34] | 2040.36 | 4.95 | 47.06 | 0.12 | 5.9 |
| La—Li—O—Si—Sn—Y | Li56La5Y19Si2(Sn7O48)2 | [12.84 12.84 12.32] | 2032.34 | 4.92 | 48.8 | 0.12 | 6.29 |

TABLE 1-continued

Examples of $Si^{4+}$ optimized compositions

| Chemical System | Chemical Formula | Lattice[a b c](Å) | Volume (Å) | Density (g/cc) | $E_{hull}$ (meV/atom) | $Si^{4+}$ concentration | % price change |
|---|---|---|---|---|---|---|---|
| La—Li—O—Si—Sn—Y | Li56La7Y17Si2(Sn7O48)2 | [12.86 12.87 12.35] | 2044.44 | 4.98 | 45.4 | 0.12 | 5.5 |
| La—Li—O—Si—Sn—Y | Li28La4Y8SiSn7O48 | [12.89 12.89 12.36] | 2053.9 | 4.99 | 44.15 | 0.12 | 5.11 |
| La—Li—O—Si—Sn—Y | Li28La2Y10SiSn7O48 | [12.82 12.82 12.32] | 2024.32 | 4.9 | 49.56 | 0.12 | 6.69 |
| La—Li—O—Si—Sn—Y | Li56La9Y15Si2(Sn7O48)2 | [12.91 12.9 12.38] | 2061.96 | 5.01 | 43.45 | 0.12 | 4.71 |
| La—Li—O—Si—Sn—Y | Li28La5Y7SiSn7O48 | [12.93 12.9 12.38] | 2065.72 | 5.05 | 42.54 | 0.12 | 4.32 |
| La—Li—O—Si—Sn—Y | Li56La11Y13Si2(Sn7O48)2 | [12.96 12.92 12.4] | 2077.53 | 5.06 | 42.17 | 0.12 | 3.92 |
| Bi—La—Li—O—Si—Sr | Sr7Li28La5SiBi7O48 | [13.37 13.4 12.74] | 2282.56 | 5.47 | 10.98 | 0.12 | −3.45 |
| La—Li—O—Si—Sn—Y | Li28La6Y6SiSn7O48 | [12.97 12.95 12.41] | 2084.1 | 5.08 | 40.95 | 0.12 | 3.53 |
| La—Li—O—Si—Sn—Y | Li28LaY11SiSn7O48 | [12.78 12.79 12.29] | 2009.22 | 4.86 | 52.16 | 0.12 | 7.48 |
| La—Li—O—Si—Sn—Y | Li56La13Y11Si2(Sn7O48)2 | [13. 12.96 12.43] | 2092.6 | 5.1 | 40.32 | 0.12 | 3.13 |
| Bi—Ca—La—Li—O—Si | Li28Ca7La5SiBi7O48 | [13.16 13.24 12.61] | 2197.59 | 5.18 | 25.96 | 0.12 | −3.34 |
| La—Li—O—Si—Sn—Y | Li56La3Y21Si2(Sn7O48)2 | [12.8 12.81 12.3] | 2016.53 | 4.88 | 50.79 | 0.12 | 7.09 |
| La—Li—O—Si—Sn—Y | Li28La7Y5SiSn7O48 | [13.01 12.98 12.44] | 2100.9 | 5.12 | 38.88 | 0.12 | 2.73 |
| La—Li—O—Si—Sn—Y | Li56La15Y9Si2(Sn7O48)2 | [13.02 13.01 12.45] | 2108.04 | 5.14 | 38.29 | 0.12 | 2.34 |
| Ca—La—Li—O—Sb—Si | Li28Ca7La5SiSb7O48 | [12.98 13.05 12.35] | 2091.76 | 4.47 | 29.19 | 0.12 | −3.99 |
| La—Li—O—Si—Sn—Y | Li28La8Y4SiSn7O48 | [13.05 13.02 12.46] | 2116.18 | 5.16 | 37.14 | 0.12 | 1.94 |
| La—Li—O—Si—Sn—Y | Li56La23YSi2(Sn7O48)2 | [13.16 13.14 12.54] | 2169.73 | 5.3 | 29.24 | 0.12 | −0.83 |
| La—Li—O—Si—Sn—Y | Li56La17Y7Si2(Sn7O48)2 | [13.07 13.03 12.47] | 2124.37 | 5.18 | 36.36 | 0.12 | 1.55 |
| La—Li—O—Si—Sn—Y | Li28La11YSiSn7O48 | [13.15 13.12 12.53] | 2161.88 | 5.28 | 30.58 | 0.12 | −0.43 |
| La—Li—O—Si—Sn—Y | Li28La9Y3SiSn7O48 | [13.08 13.05 12.48] | 2130.98 | 5.2 | 35.47 | 0.12 | 1.15 |
| La—Li—O—Sb—Si—Sr | Sr7Li28La5SiSb7O48 | [13.18 13.22 12.48] | 2175.62 | 4.81 | 21.36 | 0.12 | −4.1 |
| La—Li—O—Si—Sn—Y | Li56La21Y3Si2(Sn7O48)2 | [13.14 13.1 12.52] | 2155.38 | 5.26 | 31.83 | 0.12 | −0.03 |
| La—Li—O—Si—Sn—Y | Li56La19Y5Si2(Sn7O48)2 | [13.1 13.08 12.5] | 2140.54 | 5.22 | 33.93 | 0.12 | 0.76 |
| La—Li—O—Si—Sn—Y | Li28La10Y2SiSn7O48 | [13.11 13.09 12.5] | 2146.31 | 5.24 | 33.92 | 0.12 | 0.36 |
| La—Li—O—Si—Sn—Y | Li56La13Y11Si3Sn13O96 | [12.97 12.93 12.4] | 2079.38 | 5.06 | 51.57 | 0.19 | 2.87 |
| La—Li—O—Si—Sn—Y | Li56La12Y12Si3Sn13O96 | [12.95 12.92 12.38] | 2070.41 | 5.04 | 52.87 | 0.19 | 3.27 |
| La—Li—O—Si—Sn—Y | Li56La11Y13Si3Sn13O96 | [12.93 12.89 12.37] | 2063.15 | 5.02 | 53.47 | 0.19 | 3.67 |
| La—Li—O—Si—Sn—Y | Li56La3Y21Si3Sn13O96 | [12.77 12.78 12.27] | 2001.99 | 4.84 | 61.96 | 0.19 | 6.83 |
| La—Li—O—Si—Sn—Y | Li56LaY23Si3Sn13O96 | [12.75 12.75 12.25] | 1989.77 | 4.79 | 64.29 | 0.19 | 7.62 |
| La—Li—O—Si—Sn—Y | Li56La4Y20Si3Sn13O96 | [12.79 12.8 12.28] | 2009.59 | 4.86 | 60.76 | 0.19 | 6.43 |
| La—Li—O—Si—Sn—Y | Li56La14Y10Si3Sn13O96 | [12.98 12.95 12.41] | 2086.72 | 5.08 | 50.79 | 0.19 | 2.48 |
| La—Li—O—Si—Sn—Y | Li56La8Y16Si3Sn13O96 | [12.86 12.86 12.32] | 2038.03 | 4.96 | 56.06 | 0.19 | 4.85 |
| La—Li—O—Si—Sn—Y | Li56La7Y17Si3Sn13O96 | [12.84 12.85 12.32] | 2031.77 | 4.93 | 56.76 | 0.19 | 5.25 |
| La—Li—O—Si—Sn—Y | Li56La6Y18Si3Sn13O96 | [12.82 12.83 12.3] | 2023.51 | 4.91 | 58.89 | 0.19 | 5.64 |
| La—Li—O—Si—Sn—Y | Li56La5Y19Si3Sn13O96 | [12.8 12.81 12.29] | 2016.09 | 4.89 | 59.33 | 0.19 | 6.04 |
| La—Li—O—Si—Sn—Y | Li56La10Y14Si3Sn13O96 | [12.91 12.88 12.36] | 2055.9 | 5.0 | 53.64 | 0.19 | 4.06 |
| La—Li—O—Si—Sn—Y | Li56La9Y15Si3Sn13O96 | [12.88 12.87 12.34] | 2046.03 | 4.98 | 54.76 | 0.19 | 4.46 |
| Ca—La—Li—O—Sb—Si | Li56Ca13La11Si3Sb13O96 | [13.04 12.96 12.33] | 2084.41 | 4.49 | 41.71 | 0.19 | −4.05 |
| La—Li—O—Si—Sn—Y | Li56La16Y8Si3Sn13O96 | [13.02 12.99 12.43] | 2102.66 | 5.12 | 49.1 | 0.19 | 1.69 |
| Bi—La—Li—O—Si—Sr | Sr13Li56La11Si3Bi13O96 | [13.33 13.38 12.68] | 2261.4 | 5.43 | 26.79 | 0.19 | −3.54 |
| La—Li—O—Sb—Si—Sr | Sr13Li56La11Si3Sb13O96 | [13.18 13.18 12.43] | 2161.07 | 4.81 | 34.38 | 0.19 | −4.15 |
| Bi—Ca—La—Li—O—Si | Li56Ca13La11Si3Bi13O96 | [13.21 13.16 12.58] | 2186.68 | 5.14 | 39.82 | 0.19 | −3.45 |
| La—Li—O—Si—Sn—Y | Li56La23YSi3Sn13O96 | [13.14 13.11 12.51] | 2155.33 | 5.27 | 41.49 | 0.19 | −1.08 |
| La—Li—O—Si—Sn—Y | Li56La15Y9Si3Sn13O96 | [12.99 12.97 12.42] | 2092.81 | 5.11 | 50.1 | 0.19 | 2.08 |
| La—Li—O—Si—Sn—Y | Li56La22Y2Si3Sn13O96 | [13.13 13.09 12.5] | 2147.52 | 5.25 | 42.38 | 0.19 | −0.69 |
| La—Li—O—Si—Sn—Y | Li56La21Y3Si3Sn13O96 | [13.12 13.07 12.49] | 2141.04 | 5.22 | 43.66 | 0.19 | −0.29 |
| La—Li—O—Si—Sn—Y | Li56La2Y22Si3Sn13O96 | [12.75 12.76 12.26] | 1995.41 | 4.81 | 63.0 | 0.19 | 7.23 |
| La—Li—O—Si—Sn—Y | Li56La20Y4Si3Sn13O96 | [13.09 13.06 12.47] | 2131.97 | 5.21 | 45.03 | 0.19 | 0.11 |
| La—Li—O—Si—Sn—Y | Li56La17Y7Si3Sn13O96 | [13.04 13. 12.44] | 2108.96 | 5.15 | 48.35 | 0.19 | 1.29 |
| La—Li—O—Si—Sn—Y | Li56La19Y5Si3Sn13O96 | [13.07 13.05 12.46] | 2125.19 | 5.19 | 46.13 | 0.19 | 0.5 |
| La—Li—O—Si—Sn—Y | Li56La18Y6Si3Sn13O96 | [13.06 13.02 12.46] | 2117.86 | 5.16 | 47.13 | 0.19 | 0.9 |
| La—Li—O—Si—Sn—Y | Li56La13Y11Si4(SnO8)12 | [12.94 12.9 12.37] | 2065.78 | 5.02 | 63.62 | 0.25 | 2.62 |
| La—Li—O—Si—Sn—Y | Li14La3Y3Si(SnO8)3 | [12.92 12.89 12.36] | 2057.62 | 5.0 | 64.12 | 0.25 | 3.01 |
| La—Li—O—Si—Sn—Y | Li28LaY11Si2(SnO8)6 | [12.72 12.73 12.23] | 1980.84 | 4.77 | 73.42 | 0.25 | 6.97 |
| La—Li—O—Si—Sn—Y | Li56La3Y21Si4(SnO8)12 | [12.74 12.75 12.24] | 1987.89 | 4.8 | 72.85 | 0.25 | 6.57 |
| La—Li—O—Si—Sn—Y | Li56LaY23Si4(SnO8)12 | [12.7 12.71 12.21] | 1971.83 | 4.75 | 74.71 | 0.25 | 7.37 |
| La—Li—O—Si—Sn—Y | Li14LaY5Si(SnO8)3 | [12.76 12.77 12.25] | 1995.61 | 4.82 | 72.4 | 0.25 | 6.18 |
| La—Li—O—Si—Sn—Y | Li56La5Y19Si4(SnO8)12 | [12.78 12.79 12.26] | 2003.07 | 4.85 | 70.77 | 0.25 | 5.78 |
| La—Li—O—Si—Sn—Y | Li56La11Y13Si4(SnO8)12 | [12.9 12.87 12.34] | 2049.16 | 4.98 | 65.39 | 0.25 | 3.41 |
| La—Li—O—Si—Sn—Y | Li56La9Y15Si4(SnO8)12 | [12.85 12.85 12.31] | 2033.51 | 4.94 | 66.39 | 0.25 | 4.2 |
| La—Li—O—Si—Sn—Y | Li14La2Y4Si(SnO8)3 | [12.82 12.83 12.3] | 2024.22 | 4.92 | 66.47 | 0.25 | 4.6 |
| La—Li—O—Si—Sn—Y | Li56La7Y17Si4(SnO8)12 | [12.81 12.82 12.29] | 2016.76 | 4.9 | 68.2 | 0.25 | 4.99 |
| La—Li—O—Si—Sn—Y | Li28La3Y9Si2(SnO8)6 | [12.79 12.8 12.27] | 2009.3 | 4.87 | 69.61 | 0.25 | 5.39 |
| La—Li—O—Si—Sn—Y | Li28La5Y7Si2(SnO8)6 | [12.88 12.86 12.33] | 2040.85 | 4.96 | 65.34 | 0.25 | 3.81 |
| La—Li—O—Si—Sn—Y | Li28La7Y5Si2(SnO8)6 | [12.95 12.93 12.38] | 2071.95 | 5.05 | 63.17 | 0.25 | 2.22 |
| La—Li—O—Si—Sn—Y | Li14La4Y2Si(SnO8)3 | [12.99 12.96 12.4] | 2087.79 | 5.09 | 60.87 | 0.25 | 1.43 |
| La—Li—O—Si—Sn—Y | Li56La15Y9Si4(SnO8)12 | [12.96 12.95 12.39] | 2079.47 | 5.07 | 61.71 | 0.25 | 1.83 |
| La—Li—O—Si—Sn—Y | Li56La23YSi4(SnO8)12 | [13.11 13.08 12.48] | 2141.41 | 5.23 | 53.11 | 0.25 | −1.34 |
| Bi—Ca—La—Li—O—Si | Li14Ca3La3Si(BiO8)3 | [13.15 13.15 12.55] | 2170.91 | 5.12 | 53.4 | 0.25 | −3.55 |
| Ca—La—Li—O—Sb—Si | Li14Ca3La3Si(SbO8)3 | [13.01 12.97 12.31] | 2077.33 | 4.51 | 54.05 | 0.25 | −4.11 |
| La—Li—O—Si—Sn—Y | Li28La11YSi2(SnO8)6 | [13.1 13.06 12.46] | 2131.95 | 5.21 | 55.15 | 0.25 | −0.94 |
| Bi—La—Li—O—Si—Sr | Sr3Li14La3Si(BiO8)3 | [13.27 13.36 12.64] | 2240.83 | 5.38 | 41.26 | 0.25 | −3.64 |
| La—Li—O—Si—Sn—Y | Li56La21Y3Si4(SnO8)12 | [13.09 13.04 12.46] | 2126.34 | 5.19 | 55.9 | 0.25 | −0.55 |
| La—Li—O—Si—Sn—Y | Li14La5YSi(SnO8)3 | [13.07 13.03 12.45] | 2118.91 | 5.17 | 56.96 | 0.25 | −0.15 |
| La—Li—O—Sb—Si—Sr | Sr3Li14La3Si(SbO8)3 | [13.14 13.17 12.41] | 2146.04 | 4.81 | 47.61 | 0.25 | −4.2 |

TABLE 1-continued

| Examples of $Si^{4+}$ optimized compositions | | | | | | | |
|---|---|---|---|---|---|---|---|
| Chemical System | Chemical Formula | Lattice[a b c](Å) | Volume (Å) | Density (g/cc) | $E_{hull}$ (meV/atom) | $Si^{4+}$ concentration | % price change |
| La—Li—O—Si—Sn—Y | Li56La19Y5Si4(SnO8)12 | [13.04 13.02 12.44] | 2110.99 | 5.15 | 58.25 | 0.25 | 0.25 |
| La—Li—O—Si—Sn—Y | Li28La9Y3Si2(SnO8)6 | [13.03 13. 12.43] | 2105.1 | 5.12 | 59.11 | 0.25 | 0.64 |
| La—Li—O—Si—Sn—Y | Li56La17Y7Si4(SnO8)12 | [13.02 12.96 12.41] | 2094.79 | 5.11 | 60.1 | 0.25 | 1.04 |
| La—Li—O—Sb—Si—Sr | Sr11Li56La13Si5Sb11O96 | [13.1 13.14 12.37] | 2130.28 | 4.81 | 62.09 | 0.31 | −4.25 |
| La—Li—O—Si—Sn—Y | Li56La6Y18Si5Sn11O96 | [12.76 12.77 12.24] | 1994.62 | 4.83 | 79.91 | 0.31 | 5.13 |
| La—Li—O—Si—Sn—Y | Li56La3Y21Si5Sn11O96 | [12.71 12.72 12.2] | 1973.34 | 4.76 | 83.36 | 0.31 | 6.32 |
| La—Li—O—Si—Sn—Y | Li56La8Y16Si5Sn11O96 | [12.8 12.81 12.25] | 2009.15 | 4.88 | 78.63 | 0.31 | 4.34 |
| La—Li—O—Si—Sn—Y | Li56La9Y15Si5Sn11O96 | [12.82 12.82 12.27] | 2016.66 | 4.9 | 77.7 | 0.31 | 3.95 |
| La—Li—O—Si—Sn—Y | Li56La2Y22Si5Sn11O96 | [12.69 12.7 12.19] | 1963.93 | 4.74 | 84.02 | 0.31 | 6.71 |
| La—Li—O—Si—Sn—Y | Li56La10Y14Si5Sn11O96 | [12.85 12.83 12.29] | 2027.53 | 4.92 | 76.8 | 0.31 | 3.55 |
| La—Li—O—Si—Sn—Y | Li56La11Y13Si5Sn11O96 | [12.87 12.84 12.3] | 2033.11 | 4.95 | 76.66 | 0.31 | 3.15 |
| La—Li—O—Si—Sn—Y | Li56La12Y12Si5Sn11O96 | [12.89 12.87 12.32] | 2042.36 | 4.96 | 75.68 | 0.31 | 2.76 |
| La—Li—O—Si—Sn—Y | Li56La13Y11Si5Sn11O96 | [12.91 12.88 12.33] | 2050.43 | 4.98 | 75.53 | 0.31 | 2.36 |
| La—Li—O—Si—Sn—Y | Li56LaY23Si5Sn11O96 | [12.68 12.68 12.18] | 1957.54 | 4.71 | 85.09 | 0.31 | 7.11 |
| La—Li—O—Si—Sn—Y | Li56La4Y20Si5Sn11O96 | [12.73 12.74 12.21] | 1979.54 | 4.79 | 82.62 | 0.31 | 5.92 |
| La—Li—O—Si—Sn—Y | Li56La7Y17Si5Sn11O96 | [12.79 12.79 12.24] | 2002.63 | 4.85 | 79.61 | 0.31 | 4.74 |
| La—Li—O—Si—Sn—Y | Li56La5Y19Si5Sn11O96 | [12.75 12.75 12.22] | 1988.06 | 4.81 | 81.05 | 0.31 | 5.53 |
| La—Li—O—Si—Sn—Y | Li56La15Y9Si5Sn11O96 | [12.94 12.92 12.35] | 2064.76 | 5.03 | 72.98 | 0.31 | 1.57 |
| La—Li—O—Si—Sn—Y | Li56La22Y2Si5Sn11O96 | [13.08 13.04 12.43] | 2120.08 | 5.17 | 65.96 | 0.31 | −1.2 |
| La—Li—O—Si—Sn—Y | Li56La16Y8Si5Sn11O96 | [12.97 12.93 12.37] | 2073.89 | 5.05 | 72.08 | 0.31 | 1.18 |
| La—Li—O—Si—Sn—Y | Li56La14Y10Si5Sn11O96 | [12.92 12.89 12.35] | 2057.87 | 5.01 | 73.7 | 0.31 | 1.97 |
| La—Li—O—Si—Sn—Y | Li56La17Y7Si5Sn11O96 | [12.99 12.94 12.38] | 2080.54 | 5.07 | 71.82 | 0.31 | 0.78 |
| La—Li—O—Si—Sn—Y | Li56La18Y6Si5Sn11O96 | [13. 12.96 12.39] | 2088.34 | 5.09 | 70.83 | 0.31 | 0.39 |
| La—Li—O—Si—Sn—Y | Li56La19Y5Si5Sn11O96 | [13.01 12.99 12.4] | 2096.68 | 5.11 | 69.82 | 0.31 | −0.01 |
| La—Li—O—Si—Sn—Y | Li56La2OY4Si5Sn11O96 | [13.04 13. 12.41] | 2104.68 | 5.13 | 68.92 | 0.31 | −0.41 |
| Bi—La—Li—O—Si—Sr | Sr11Li56La13Si5Bi11O96 | [13.24 13.32 12.61] | 2222.58 | 5.33 | 57.58 | 0.31 | −3.74 |
| Bi—Ca—La—Li—O—Si | Li56Ca11La13Si5Bi11O96 | [13.12 13.15 12.51] | 2159.05 | 5.08 | 68.76 | 0.31 | −3.65 |
| La—Li—O—Si—Sn—Y | Li56La23YSi5Sn11O96 | [13.08 13.06 12.45] | 2126.6 | 5.2 | 65.15 | 0.31 | −1.59 |
| La—Li—O—Si—Sn—Y | Li56La21Y3Si5Sn11O96 | [13.06 13.01 12.42] | 2110.45 | 5.16 | 68.04 | 0.31 | −0.8 |
| Ca—La—Li—O—Sb—Si | Li56Ca11La13Si5Sb11O96 | [12.99 12.97 12.28] | 2069.58 | 4.53 | 66.95 | 0.31 | −4.17 |
| La—Li—O—Si—Sn—Y | Li28La6Y6Si3Sn5O48 | [12.86 12.84 12.28] | 2026.69 | 4.93 | 87.07 | 0.38 | 2.5 |
| La—Li—O—Si—Sn—Y | Li56La11Y13Si6(Sn5O48)2 | [12.85 12.82 12.27] | 2020.31 | 4.9 | 87.31 | 0.38 | 2.9 |
| La—Li—O—Si—Sn—Y | Li56La9Y15Si6(Sn5O48)2 | [12.8 12.79 12.24] | 2004.13 | 4.86 | 87.97 | 0.38 | 3.69 |
| La—Li—O—Si—Sn—Y | Li28La3Y9Si3Sn5O48 | [12.74 12.75 12.19] | 1979.37 | 4.79 | 91.26 | 0.38 | 4.88 |
| La—Li—O—Si—Sn—Y | Li56La7Y17Si6(Sn5O48)2 | [12.76 12.76 12.21] | 1987.61 | 4.82 | 90.2 | 0.38 | 4.48 |
| La—Li—O—Si—Sn—Y | Li56La5Y19Si6(Sn5O48)2 | [12.72 12.72 12.18] | 1971.36 | 4.77 | 92.07 | 0.38 | 5.27 |
| La—Li—O—Si—Sn—Y | Li28La2Y10Si3Sn5O48 | [12.7 12.7 12.17] | 1964.18 | 4.75 | 92.16 | 0.38 | 5.67 |
| La—Li—O—Si—Sn—Y | Li56La3Y21Si6(Sn5O48)2 | [12.69 12.69 12.16] | 1957.79 | 4.72 | 93.27 | 0.38 | 6.06 |
| La—Li—O—Si—Sn—Y | Li28LaY11Si3Sn5O48 | [12.67 12.68 12.15] | 1951.73 | 4.69 | 94.49 | 0.38 | 6.46 |
| La—Li—O—Si—Sn—Y | Li56LaY23Si6(Sn5O48)2 | [12.65 12.65 12.14] | 1942.19 | 4.67 | 95.3 | 0.38 | 6.85 |
| La—Li—O—Si—Sn—Y | Li28La4Y8Si3Sn5O48 | [12.78 12.78 12.21] | 1994.24 | 4.84 | 88.98 | 0.38 | 4.09 |
| La—Li—O—Si—Sn—Y | Li56La13Y11Si6(Sn5O48)2 | [12.89 12.85 12.29] | 2035.78 | 4.95 | 86.14 | 0.38 | 2.11 |
| La—Li—O—Si—Sn—Y | Li28La5Y7Si3Sn5O48 | [12.82 12.8 12.25] | 2011.67 | 4.88 | 87.26 | 0.38 | 3.29 |
| La—Li—O—Si—Sn—Y | Li56La21Y3Si6(Sn5O48)2 | [13.04 12.98 12.39] | 2096.42 | 5.12 | 79.14 | 0.38 | −1.06 |
| La—Li—O—Si—Sn—Y | Li56La23YSi6(Sn5O48)2 | [13.06 13.04 12.41] | 2113.33 | 5.16 | 76.48 | 0.38 | −1.85 |
| La—Li—O—Si—Sn—Y | Li28La11YSi3Sn5O48 | [13.04 13.01 12.39] | 2101.34 | 5.15 | 77.82 | 0.38 | −1.45 |
| La—Li—O—Si—Sn—Y | Li28La7Y5Si3Sn5O48 | [12.89 12.87 12.31] | 2043.01 | 4.97 | 84.97 | 0.38 | 1.71 |
| La—Li—O—Sb—Si—Sr | Sr5Li28La7Si3Sb5O48 | [13.08 13.14 12.34] | 2120.01 | 4.8 | 75.1 | 0.38 | −4.3 |
| La—Li—O—Si—Sn—Y | Li28La10Y2Si3Sn5O48 | [13.01 12.97 12.38] | 2089.48 | 5.1 | 79.79 | 0.38 | −0.66 |
| Ca—La—Li—O—Sb—Si | Li28Ca5La7Si3Sb5O48 | [12.97 12.99 12.26] | 2065.39 | 4.55 | 80.28 | 0.38 | −4.22 |
| La—Li—O—Si—Sn—Y | Li56La19Y5Si6(Sn5O48)2 | [12.99 12.96 12.36] | 2081.42 | 5.08 | 80.93 | 0.38 | −0.27 |
| Bi—La—Li—O—Si—Sr | Sr5Li28La7Si3Bi5O48 | [13.21 13.29 12.55] | 2204.48 | 5.28 | 72.78 | 0.38 | −3.83 |
| La—Li—O—Si—Sn—Y | Li28La9Y3Si3Sn5O48 | [12.98 12.93 12.36] | 2074.11 | 5.05 | 81.4 | 0.38 | 0.13 |
| Bi—Ca—La—Li—O—Si | Li28Ca5La7Si3Bi5O48 | [13.1 13.15 12.47] | 2148.42 | 5.05 | 82.64 | 0.38 | −3.76 |
| La—Li—O—Si—Sn—Y | Li56La17Y7Si6(Sn5O48)2 | [12.97 12.91 12.34] | 2065.16 | 5.04 | 82.76 | 0.38 | 0.53 |
| La—Li—O—Si—Sn—Y | Li28La8Y4Si3Sn5O48 | [12.94 12.9 12.33] | 2058.5 | 5.01 | 83.1 | 0.38 | 0.92 |
| La—Li—O—Si—Sn—Y | Li56La15Y9Si6(Sn5O48)2 | [12.91 12.89 12.32] | 2050.36 | 4.99 | 84.21 | 0.38 | 1.32 |
| La—Li—O—Si—Sn—Y | Li56La11Y13Si7(Sn3O32)3 | [12.81 12.78 12.23] | 2002.6 | 4.87 | 97.89 | 0.44 | 2.64 |
| La—Li—O—Si—Sn—Y | Li56La16Y8Si7(Sn3O32)3 | [12.91 12.87 12.29] | 2043.59 | 4.98 | 94.69 | 0.44 | 0.67 |
| La—Li—O—Si—Sn—Y | Li56La10Y14Si7(Sn3O32)3 | [12.79 12.78 12.21] | 1996.55 | 4.84 | 98.64 | 0.44 | 3.04 |
| La—Li—O—Si—Sn—Y | Li56La13Y11Si7(Sn3O32)3 | [12.85 12.82 12.26] | 2019.75 | 4.91 | 96.71 | 0.44 | 1.85 |
| La—Li—O—Si—Sn—Y | Li56La14Y10Si7(Sn3O32)3 | [12.86 12.83 12.27] | 2025.24 | 4.94 | 95.49 | 0.44 | 1.46 |
| La—Li—O—Si—Sn—Y | Li56La15Y9Si7(Sn3O32)3 | [12.88 12.86 12.29] | 2035.23 | 4.96 | 95.2 | 0.44 | 1.06 |
| La—Li—O—Si—Sn—Y | Li56La12Y12Si7(Sn3O32)3 | [12.83 12.81 12.24] | 2011.82 | 4.89 | 97.47 | 0.44 | 2.25 |
| Bi—Ca—La—Li—O—Si | Li56Ca9La15Si7(Bi3O32)3 | [13.05 13.16 12.44] | 2136.3 | 5.01 | 97.32 | 0.44 | −3.86 |
| La—Li—O—Si—Sn—Y | Li56La8Y16Si7(Sn3O32)3 | [12.75 12.75 12.18] | 1980.55 | 4.8 | 99.5 | 0.44 | 3.83 |
| La—Li—O—Si—Sn—Y | Li56La17Y7Si7(Sn3O32)3 | [12.94 12.89 12.3] | 2051.37 | 5.0 | 93.77 | 0.44 | 0.27 |
| Ca—La—Li—O—Sb—Si | Li56Ca9La15Si7(Sb3O32)3 | [12.93 13. 12.25] | 2058.34 | 4.57 | 93.53 | 0.44 | −4.28 |
| La—Li—O—Si—Sn—Y | Li56La19Y5Si7(Sn3O32)3 | [12.96 12.94 12.33] | 2067.16 | 5.04 | 92.04 | 0.44 | −0.52 |
| La—Li—O—Si—Sn—Y | Li56La20Y4Si7(Sn3O32)3 | [12.98 12.95 12.34] | 2074.12 | 5.06 | 91.4 | 0.44 | −0.92 |
| La—Li—O—Si—Sn—Y | Li56La21Y3Si7(Sn3O32)3 | [13.01 12.96 12.36] | 2082.5 | 5.08 | 90.6 | 0.44 | −1.31 |
| La—Li—O—Si—Sn—Y | Li56La22Y2Si7(Sn3O32)3 | [13.02 12.98 12.36] | 2089.48 | 5.1 | 89.21 | 0.44 | −1.71 |
| La—Li—O—Si—Sn—Y | Li56La23YSi7(Sn3O32)3 | [13.03 13.01 12.38] | 2097.32 | 5.13 | 88.64 | 0.44 | −2.1 |
| La—Li—O—Sb—Si—Sr | Sr9Li56La15Si7(Sb3O32)3 | [13.04 13.12 12.31] | 2105.41 | 4.8 | 88.57 | 0.44 | −4.35 |
| Bi—La—Li—O—Si—Sr | Sr9Li56La15Si7(Bi3O32)3 | [13.16 13.26 12.52] | 2184.48 | 5.23 | 88.3 | 0.44 | −3.93 |

TABLE 1-continued

| Examples of $Si^{4+}$ optimized compositions | | | | | | | |
|---|---|---|---|---|---|---|---|
| Chemical System | Chemical Formula | Lattice[a b c](Å) | Volume (Å) | Density (g/cc) | $E_{hull}$ (meV/atom) | $Si^{4+}$ concentration | % price change |
| La—Li—O—Si—Sn—Y | Li56La18Y6Si7(Sn3O32)3 | [12.94 12.91 12.32] | 2057.76 | 5.02 | 93.83 | 0.44 | −0.13 |
| La—Li—O—Si—Sn—Y | Li56La9Y15Si7(Sn3O32)3 | [12.77 12.76 12.19] | 1986.81 | 4.83 | 99.69 | 0.44 | 3.43 |

The exemplary structures consider $Ca^{2+}$: 0.375 to 0.625, $Sr^{2+}$: 0.375 to 0.625, $La^{3+}$: 0.041666666666666664 to 0.9583333333333334, $Y^{3+}$: 0.041666666666666664 to 0.9583333333333334, $Bi^{5+}$: 0.5625 to 0.9375, $Si^{4+}$: 0.0625 to 0.4375, $Sb^{5+}$: 0.5625 to 0.9375, and $Sn^{4+}$: 0.5625 to 0.9375.

Thus, as mentioned above, an embodiment stabilizes derivatives of the cubic LLZO phase while maintaining nominal Li concentrations and lowering the total material cost by replacing $La^{3+}$ and $Zr^{4+}$ with elements of which the combination is less expensive than the parent LLZO composition. The strategic combination of one element or more of each oxidation state type strategically leads to a lower cost composition of the cubic LLZO composition, while maintaining the nominal concentration of Li (7 per formula unit). Furthermore, co-doping both $La^{3+}$ and $Zr^{4+}$ sites leads to an increased configurational entropy ($S_{ideal}$) which consequently increases the stability of phases historically known as unstable.

Further, using the standard solid-state method, examples of the Li-garnet material with dopants substituted for $La^{3+}$ and $Zr^{4+}$ were synthesized following the substitution rules in an embodiment, as described below.

A list of tested compositions and XRD results are included in Table 2 to demonstrate the results provided by the doping strategy in this material. The tested compositions included in Table 2 were prepared in the following manner.

Example 1

The compound $Li_7La_{2.25}Ca_{0.75}Zr_{0.75}Ta_{0.75}Si_{0.5}O_{12}$ in Example 1 was prepared using the precursor powders lithium carbonate, lanthanum hydroxide, calcium carbonate, zirconium oxide, tantalum oxide, and silicon oxide, mixed in a stoichiometric ratio with the addition of 30% excess lithium precursor to mitigate lithium evaporation during heat treatment. The precursor powders were then processed in a planetary mill at 350 rpm for 24 hours using zirconia mixing balls. The precursor mixture was then heat treated at 1100 C for 4 hours to produce a powder of the desired composition and crystal structure.

Example 2 and Comparative Examples 1 and 2

The compounds in Example 2 and Comparative Examples 1 and 2 were prepared in a manner similar to that described above in Example 1, except that calcium carbonate and tantalum oxide were not used as precursor powders in the Comparative Examples.

Figure 3A:
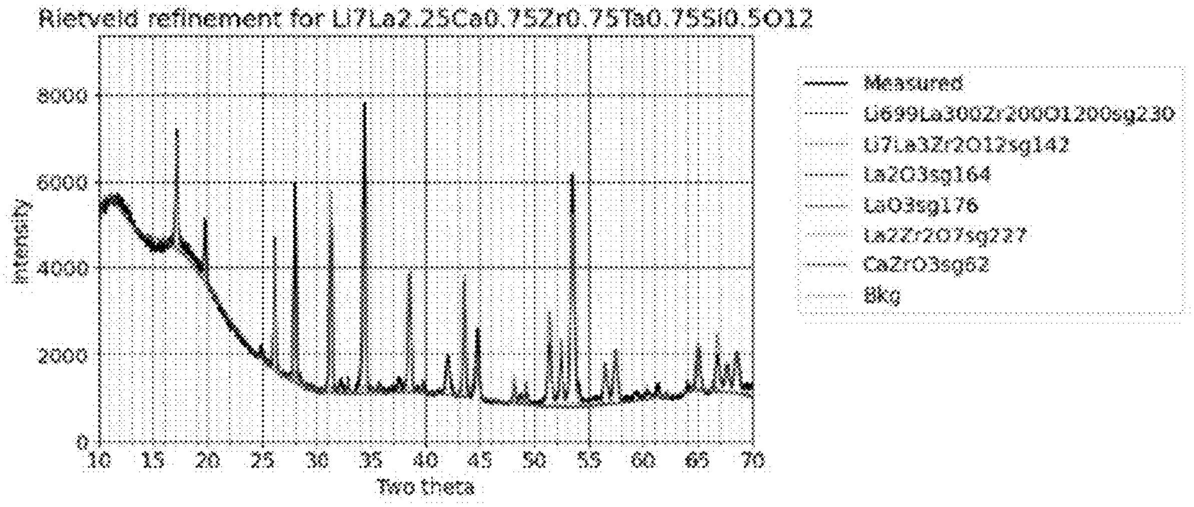
FIG. 3A is an XRD pattern with Rietveld refinement for Example 1.
Figure 3B:
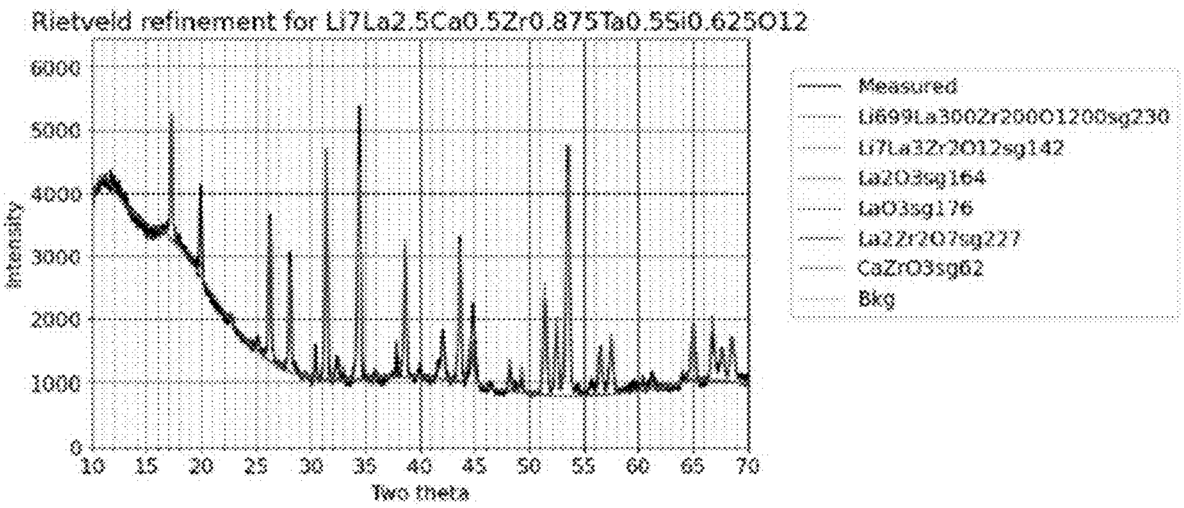
FIG. 3B is an XRD pattern with Rietveld refinement for Example 2.
Figure 3C:
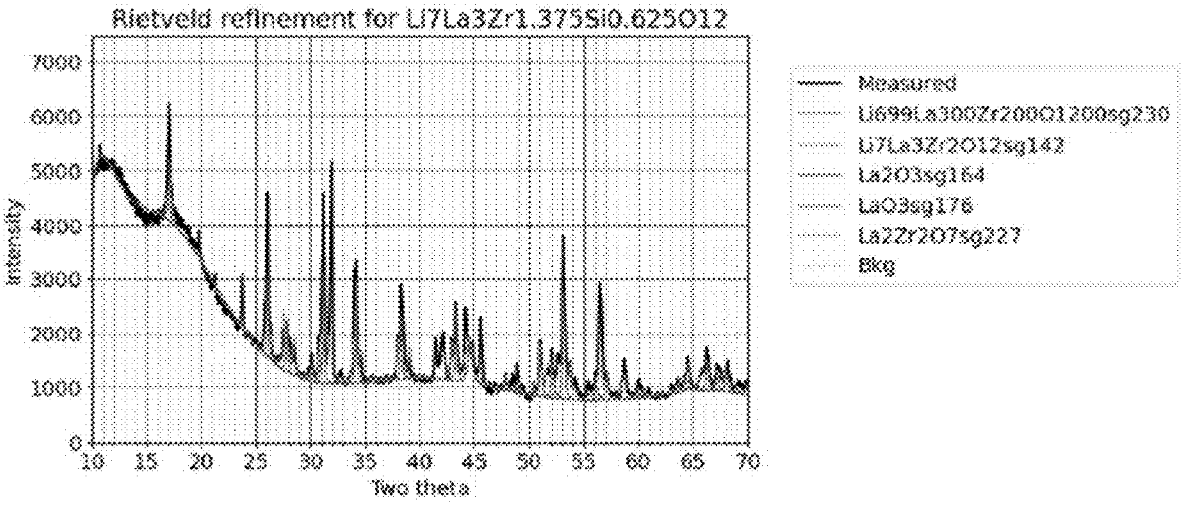
FIG. 3C is an XRD pattern with Rietveld refinement for Comparative Example 1.
Figure 3D:
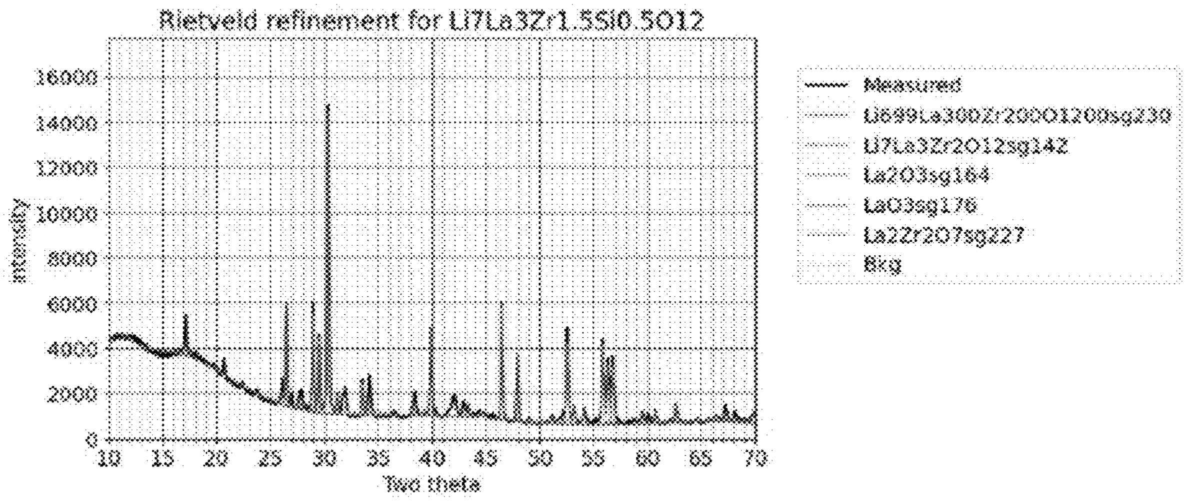
FIG. 3D is an XRD pattern with Rietveld refinement for Comparative Example 2.

The synthesized materials were characterized via XRD to confirm the presence of the cubic garnet phase at room temperature, as well as SEM/EDS to confirm that the dopants have been incorporated into the parent structure. The results are shown in Table 2 below. XRD patterns with Rietveld refinement for Examples 1 and 2 and Comparative Examples 1 and 2 are shown in FIGS. 3A-3D, illustrating that co-doped samples have high purity of cubic LLZO, with Si content of up to 0.625 per formula unit, while samples where only the $Zr^{4+}$ site is doped at high $Si^{4+}$ concentration show very low purity. In particular, FIGS. 3A-3D show XRD results for the various samples, with Rietveld refinement fitting for cubic LLZO (blue), as follows. FIG. 3A shows a positive result: cubic LLZO with very high purity by co-doping (Example 1); FIG. 3B shows a positive result: cubic LLZO with high purity by co-doping (Example 2); FIG. 3C shows a negative result: low purity by only Si doping (Comparative Example 1); and FIG. 3D shows a negative result: very low purity by only Si doping (Comparative Example 2).

TABLE 2

| List of synthesized compositions, with XRD fitting results | | | |
|---|---|---|---|
| Sample ID | Target composition | XRD result | Note |
| Ex. 1 | $Li_7La_{2.25}Ca_{0.75}Zr_{0.75}Ta_{0.75}Si_{0.5}O_{12}$ | Very high purity | Positive result |
| Ex. 2 | $Li_7La_{2.5}Ca_{0.5}Zr_{0.875}Ta_{0.5}Si_{0.625}O_{12}$ | High purity | Positive result |
| Comp. Ex. 1 | $Li_7La_3Zr_{1.375}Si_{0.625}O_{12}$ | Low purity | Negative result |
| Comp. Ex. 2 | $Li_7La_3Zr_{1.5}Si_{0.5}O_{12}$ | Very low purity | Negative result |

Si substitution is desirable due to low cost, but substitution of Si for Zr is not usually possible due to high defect energy. However, configurational entropy effects due to multi-site doping improve stability, so that maximizing the Si content can be successfully carried out by the doping strategy, as shown in Table 2 above. That is, the experiments set forth above show that comparative examples with Si doping alone produced a very poor result, but Si doping was successful when done jointly with Ca+Ta doping, as shown in the examples. The experiments were done side-by-side with an identical procedure, other than the amounts of each precursor that was added. This strongly demonstrates that multi-site doping strategies applied simultaneously on the Zr and La sites via Ca+Ta dopants together with Si in this material provides superior results.

The foregoing is illustrative of exemplary embodiments and is not to be construed as limiting the disclosure. Although a few exemplary embodiments have been described, those skilled in the art will readily appreciate that many modifications are possible in the above embodiments without materially departing from the disclosure.

What is claimed is:

1. A lithium garnet material having the following formula:

$$Li_{7-w}La_{3-x}(A_{x1}B_{x2}C^1_{x3})Zr_{2-y}(C^2_{y1}D_{y2}E_{y3})O_{12}$$

where −0.2≤w≤0.2, A is one or a combination of $Na^+$ and $K^+$, B is one or a combination of two or more of $Mg^{2+}$, $Ca^{2+}$, $Sr^{2+}$, and $Ba^{2+}$, and $C^1$ is one or a combination of two or more of $Y^{3+}$, $Sc^{3+}$, and $Ce^{3+}$, and $C^2$ is one or a combination of two or more of $Y^{3+}$, $Sc^{3+}$, and $Ce^{3+}$, D is one or a combination of two or more of $Si^{4+}$, $Sn^{4+}$, $Ti^{4+}$, and $Ce^{4+}$ and E is one or a combination of two or more of $Sb^{5+}$, $Bi^{5+}$, $Ta^{5+}$, and $Nb^{5+}$, 0.2<x<3, 0<y<2, 0≤x1<3, 0≤x2<3, 0≤x3<3, 0≤y1<2, 0<y2<2, and 0≤y3<2, and x1+x2+x3=x and y1+y2+y3=y, when y1>0, y3 is 0 or when y3>0, y1 is 0, either satisfy a charge balance mechanism with their respective doping site or satisfy any combination that maintains charge neutrality of the material.

2. The lithium garnet material of claim 1, wherein the material comprises $Si^{4+}$ and at least one of $Ca^{2+}$, $Sr^{2+}$, and $Bi^{5+}$.

3. The lithium garnet material of claim 1, wherein the material comprises $Si^{4+}$ and $Ca^{2+}$.

4. The lithium garnet material of claim 1, wherein the material comprises $Si^{4+}$ and $Sr^{2+}$.

5. The lithium garnet material of claim 1, wherein the material comprises $Si^{4+}$ and $Bi^{5+}$.

6. The lithium garnet material of claim 1, wherein the material comprises $Si^{4+}$, $Bi^{5+}$, and at least one of $Ca^{2+}$ and $Sr^{2+}$.

7. The lithium garnet material of claim 1, wherein the material comprises $Si^{4+}$ and at least one co-dopant.

8. The lithium garnet material of claim 1, wherein the material comprises $Si^{4+}$, $Ca^{2+}$, and $Ta^{5+}$.

9. A solid state lithium battery comprising a cathode active material layer, an anode active material layer, and a solid electrolyte layer formed between the cathode active material layer and the anode active material layer, wherein the solid electrolyte layer comprises the material of claim 1.

10. A lithium garnet material having the following formula:

$$Li_{7-w}La_{3-x}(A_{x1}B_{x2}C^1_{x3})Zr_{2-y}(C^2_{y1}D_{y2}E_{y3})O_{12}$$

where −0.2≤w≤0.2, A is one or a combination of $Na^+$ and $K^+$, B is one or a combination of two or more of $Mg^{2+}$, $Ca^{2+}$, $Sr^{2+}$, and $Ba^{2+}$, and $C^1$ is one or a combination of two or more of $Y^{3+}$, $Sc^{3+}$, and $Ce^{3+}$, and $C^2$ is one or a combination of two or more of $Y^{3+}$, $Sc^{3+}$, and $Ce^{3+}$, D is one or a combination of two or more of $Si^{4+}$, $Sn^{4+}$, $Ti^{4+}$, and $Ce^{4+}$ and E is one or a combination of two or more of $Sb^{5+}$, $Bi^{5+}$, $Ta^{5+}$, and $Nb^{5+}$, 0.2<x<3, 0<y≤2, 0≤x1<3, 0≤x2<3, 0≤x3<3, 0≤y1≤2, 0≤y2≤2, and 0≤y3≤2, and x1+x2+x3=x and y1+y2+y3=y, when y1>0, y3 is 0 or when y3>0, y1 is 0, either satisfy a charge balance mechanism with their respective doping site or satisfy any combination that maintains charge neutrality of the material.

11. The lithium garnet material of claim 10, wherein 0.2<x≤2 and 0<y≤2.

12. The lithium garnet material of claim 10, wherein the material comprises $Si^{4+}$ and at least one of $Ca^{2+}$, $Sr^{2+}$, and $Bi^{5+}$.

13. The lithium garnet material of claim 10, wherein the material comprises $Si^{4+}$ and $Ca^{2+}$.

14. The lithium garnet material of claim 10, wherein the material comprises $Si^{4+}$ and $Sr^{2+}$.

15. The lithium garnet material of claim 10, wherein the material comprises $Si^{4+}$ and $Bi^{5+}$.

16. The lithium garnet material of claim 10, wherein the material comprises $Si^{4+}$, $Bi^{5+}$, and at least one of $Ca^{2+}$ and $Sr^{2+}$.

17. The lithium garnet material of claim 10, wherein the material comprises $Si^{4+}$ and at least one co-dopant.

18. The lithium garnet material of claim 10, wherein the material comprises $Si^{4+}$, $Ca^{2+}$ and $Ta^{5+}$.

19. A solid state lithium battery comprising a cathode active material layer, an anode active material layer, and a solid electrolyte layer formed between the cathode active material layer and the anode active material layer, wherein the solid electrolyte layer comprises the material of claim 10.

* * * * *